United States Patent [19]

Podobinski

[11] Patent Number: 4,544,978
[45] Date of Patent: Oct. 1, 1985

[54] CIRCUIT FOR THE ARCLESS DE-ENERGIZATION OF A DIRECT CURRENT LOAD

[75] Inventor: David J. Podobinski, Washington, Pa.

[73] Assignee: Consolidation Coal Company, Pittsburgh, Pa.

[21] Appl. No.: 595,505

[22] Filed: Mar. 30, 1984

[51] Int. Cl.$^4$ ............................................. H02H 3/087
[52] U.S. Cl. ............................................ 361/4; 361/7; 361/3; 363/54; 363/138
[58] Field of Search ............... 361/1, 2, 3, 4, 5, 6, 361/7; 323/223, 237, 239, 277, 311; 363/54, 129, 138; 307/284

[56] References Cited

U.S. PATENT DOCUMENTS

| | | | |
|---|---|---|---|
| 3,075,136 | 1/1963 | Jones | 307/284 |
| 3,725,742 | 4/1973 | Pollard | |
| 3,737,759 | 6/1973 | Pollard | 363/138 |
| 3,911,352 | 10/1975 | Slack | |
| 4,042,965 | 8/1977 | Wisman | |
| 4,042,966 | 8/1977 | Newell et al. | |
| 4,045,887 | 9/1977 | Nowell | |
| 4,203,040 | 5/1980 | Abbondanti | 307/65 |
| 4,227,145 | 10/1980 | Bonikowski et al. | 324/51 |

FOREIGN PATENT DOCUMENTS 793475  8/1968  Canada .................................. 361/5

OTHER PUBLICATIONS

IBM Technical Disclosure Bulletin, vol. 6, No. 8, Jan. 64, pp. 31-32.
Thyristor Phase-Control Converter and Cycloconverters, B. R. Pelly, copyright 1971, pp. 59-66.

*Primary Examiner*—Patrick R. Salce
*Attorney, Agent, or Firm*—William A. Mikesell, Jr.; Stanley J. Price, Jr.

[57] ABSTRACT

A circuit for the arcless de-energization of a direct current load receiving direct current from a rectified alternating current source. The circuit includes a means for rectifying alternating current from an alternating current source to provide direct current to the direct current load. The means for rectifying has a current flow controller, such as a silicon controlled rectifier, connected with each phase of the alternating current source. The circuit also has means for de-energizing the then conducting current flow controller in said means for rectifying, the means for de-energizing having a current flow controller, such as a silicon controlled rectifier. The circuit further includes a voltage detection device for detecting a predetermined voltage drop in the circuit; and a time delay device for regulating the activation of the means for de-energizing. The circuit includes means for providing an actuating signal to activate to a conductive state each current flow controller in the means for rectifying and the current flow controller in the means for de-energizing. A relay device is provided in the circuit for responding to a direct current overload and operates to disconnect the actuating signal from the means for rectifying and connect the actuating signal to the means for de-energizing through the time delay device when an overload is present.

20 Claims, 2 Drawing Figures

CIRCUIT FOR THE ARCLESS DE-ENERGIZATION OF A DIRECT CURRENT LOAD

BACKGROUND OF THE INVENTION

1. Field of the Invention

The present invention relates to a circuit for the arcless de-energization of a direct current load receiving direct current from a rectified alternating current source and, more particulary, to an electric circuit for the arcless de-energization of direct current trolley systems used in an underground environment in mining operations.

2. Description of the Prior Art

In electric power distribution systems, it is common to employ circuit breakers to interrupt the flow of current from a current source, such as a direct current source, in the event of an overload on the system. A common problem that often accompanies the de-energization of a direct current load protected by a circuit breaker against overloading is the presence of arcing at the breaker as the breaker attempts to open to clear an overload on the system. In certain operations utilizing electrical power distribution systems, such as certain underground mining operations, it is particularly critical that the circuit breaker or other switching apparatus used to disconnect the load from the system in an attempt to clear the overload do so with a minimum of arcing. In an underground mining operation, for example, it is essential that the flow of current be interrupted by the safe operation of a circuit breaker, or other protective current interrupting apparatus, without destructive arcing. Arcless interruption of the flow of current in response to an overload is highly desirable in a mining environment, since arcless circuit interruption substantially minimizes the risk of equipment damage and maximizes electrical component life.

Various circuits and apparatus are known in the art for effecting circuit interruption in response to an overload. For example, U.S. Pat. No. 3,725,742 to Pollard discloses a static circuit breaker. In Pollard, a three phase, static circuit breaker has three phase switches, each of which has a pair of power thyristors connected in inverse parallel relationship with one another and a common commutation circuit. A commutating circuit is provided in each phase switch which includes a commutating capacitor, a commutating thyristor, and a commutating inductor. A common surge suppressing circuit for all the switches is also provided.

U.S. Pat. No. 4,045,887 to Nowell discloses a switching regulator control circuit. The control circuit includes silicon controlled rectifiers and inductive reactors. The control circuit provides fault detection and voltage regulation.

U.S. Pat. No. 4,042,966 to Newell et al. discloses a motor control circuit for controlling the operation of a motor having main running-speed windings and start-up windings. A fixed time delay circuit is provided to energize the main windings after a time delay following energization of the start-up windings. A lock-out circuit is additionally provided to prevent re-start of the circuit following a fault condition.

U.S. Pat. No. 4,042,965 to Wisman discloses a power interruption safeguard apparatus used in the prevention of undesirable automatic application of power to a load in the event of a power outage. Wisman's apparatus effects circuit interruption in a direct current control circuit portion of a direct current motor speed controller by means of a silicon controlled rectifier.

U.S. Pat. No. 3,911,352 to Slack discloses a blocking oscillator type power supply with power foldback short circuit protection. The blocking oscillator circuit includes a capacitor and a means for repetitively charging the capacitor at a rate which causes the oscillator to operate at a substantially lower frequency when the secondary winding of the blocking oscillator transformer is short circuited to limit the power dissipated in the oscillator.

U.S. Pat. No. 4,203,040 to Abbondanti et al. discloses a force commutated static isolator circuit to provide a bi-lateral static isolator which is activated by "soft" forced commutation. Two thyristors are connected in series opposition between two points in a power line to be interrupted. This patent mentions that a resonant circuit is applied to the conducting thyristor in order to turn it off with a relatively small reverse voltage obtained by resonant discharge of a precharged capacitor through an inductor and a diode connected in reverse with the thyristor.

U.S. Pat. No. 4,227,145 to Bonikowski et al. discloses an apparatus for detecting faults in electric cables. The apparatus includes a solid state switch unti having two thyristors arranged in an inverse-parallel configuration and continuously conducting current up to a pre-set maximum and becoming non-conductive after conducting a current in excess of the pre-set maximum for a pre-set period.

What is needed, therefore, especially in underground mining operations, is a circuit for the arcless de-energization of a direct current load. What is further needed is a circuit for the arcless de-energization of a direct current load capable of minimizing the risk of equipment damage when de-energization of a direct current load is required by the presence of an overload condition.

SUMMARY OF THE INVENTION

In accordance with the present invention, there is provided a circuit for the arcless de-energization of a direct current load receiving direct current from a rectified alternating current source. The circuit includes a means for rectifying alternating current from an alternating current source to provide therefrom direct current to the direct current load. The means for rectifying has a current flow controller, such as a silicon controlled rectifier, connected with each phase of the alternating current source; and the means for rectifying is operably connected in the circuit with the direct current load. The circuit also includes a means for de-energizing the then conducting current flow controller in the means for rectifying. The means for de-energizing has a current flow controller, such as a silicon controlled rectifier, and is operably connected in the circuit with the means for rectifying between the means for rectifying and the direct current load. The circuit includes a voltage detection device for detecting a predetermined voltage drop in the circuit, the voltage detection device being operably connected in the circuit between the means for rectifying and the direct current load. A time delay device is also included in the circuit for regulating the activation of the means for de-energizing. The time delay device is operably connected to the voltage detection device and to the current flow controller in the means for de-energizing. The circuit further includes a means for providing an actuating signal being operable to activate to a conductive state each current flow controller in the means for rectifying and in the means for de-energizing. The means for providing an actuating signal is selectively operably connected to the time delay device and to the means for rectifying. The circuit also includes a relay device being operable to respond to a direct current overload. The relay device is operably connected between the means for rectifying and the direct current load in the circuit and is operable to disconnect the actuating signal from the means for rectifying and connect the actuating signal to the means for de-energizing.

The circuit of the present invention desirably also includes a direct current circuit interruption device operably connected in the circuit between the relay device and the direct current load; and the circuit of the present invention desirably includes a means for discharging stored energy in the magnetic field of the current load upon occurrence of an overload by providing a current path for this stored energy, the means for discharging being operably connected in the circuit across the direct current load. Desirably, the means for discharging the stored energy in the magnetic field of the direct current load upon occurrence of an overload by providing a current path for this stored energy is a freewheeling diode.

The means for de-energizing in the circuit of the present invention desirably has a capacitor and an inductor serially connected with the current flow controller in the means for de-energizing, the current flow controller in the means for de-energizing desirably being a silicon controlled rectifier. It is further desirable that the capacitor in the means for de-energizing has a capacitor charging device connected across the capacitor for electrically charging the capacitor.

An object of the present invention is to provide a circuit for the arcless de-energization of a direct current load receiving direct current from a rectified alternating current source.

An additional object of the present invention is to substantially eliminate the occurrence of destructive arcing that can possibly result when a direct current circuit interrupter device, such as a direct current circuit breaker, attempts to clear an overload fault condition.

A further object of the present invention is to provide an electrical circuit for the arcless de-energization of a direct current load under overload fault conditions in an underground mining environment.

Another object of the present invention is to provide an electrical circuit for the arcless de-energization of direct current trolley systems under faulted conditions.

These and other objects of the present invention will be more completely disclosed and described in the following specification, the accompanying drawings, and the appended claims.

DESCRIPTION OF THE PREFERRED EMBODIMENTS

Figure 1:
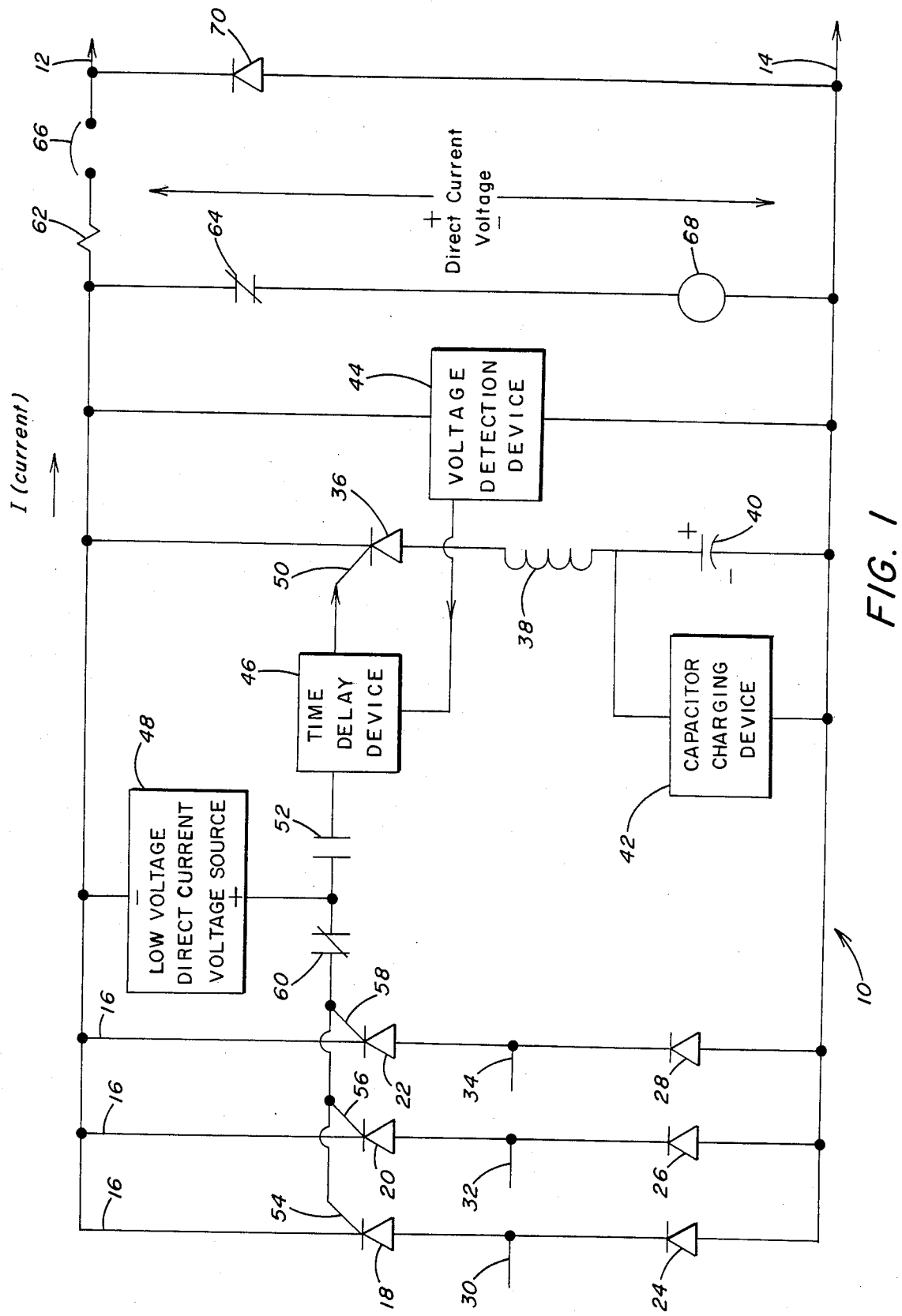
FIG. 1 is a schematic diagram of an embodiment of a circuit illustrating the present invention.

Referring to FIG. 1 of the drawings, there is illustrated a preferred embodiment of a circuit of the present invention for the arcless de-energization of a direct current load receiving direct current from a rectified alternating current source, the circuit generally designated by the numeral 10. Circuit 10 is connected across a direct current load (not shown) as would be connected to the circuit at arrows 12 and 14, respectively. Circuit 10 includes a full-wave rectifier bridge 16. Bridge 16 has current flow controllers in the form of silicon controlled rectifiers 18, 20, and 22. Bridge 16 also has diodes 24, 26 and 28 serially connected to silicon controlled rectifiers 18, 20, and 22, respectively. In circuit 10, each silicon controlled rectifier-diode pair, such as silicon controlled rectifier (abbreviated as SCR) 18 and diode 24 is connected in parallel with respect to the other two SCR-diode pairs in bridge 16. This arrangement allows for the full-wave rectification of three phase alternating current. A three phase alternating current source having phases 30, 32, and 34 is connected to rectifier bridge 16 as shown in FIG. 1 with each phase connected to an SCR-diode pair between the SCR and the diode in the pair. Bridge 16 has a current flow controller connected with each phase of the three phase alternating current source, the current flow controllers being SCRs 18, 20, and 22, respectively, in bridge 16 of circuit 10. Additionally, in circuit 10, bridge 16 is operably connected in parallel with a load (not shown) as would be located at arrows 12 and 14, respectively.

Each current flow controller of the present invention should preferably be a solid state current flow controller, such as a silicon controlled rectifier, and should have the capability to allow or block the flow of current therethrough in response to the presence or absence of an actuating signal, such as a gating signal supplied to the gate of each silicon controlled rectifier 18, 20, and 22.

While a full-wave rectifier bridge 16 is illustrated in circuit 10, other rectifying arrangements are possible under the present invention. For example, a half-wave rectifier bridge could be used. Further, the invention is also, for example, useful with a single phase alternating current source. However, the arrangement of bridge 16 illustrated in circuit 10 is preferred for most applications of the present invention, especially applications relating to mining operations for the arcless de-energization of a direct current load, such as the load imposed by a direct current trolley system, under faulted conditions. Generally, bridge 16 would be used to rectify up to about a 440 volt alternating current three phase input to provide up to about a 600 volt direct current output to the direct current load. In mining operations, for example, bridge 16 would rectify generally from about a 220 volt three phase alternating current input to about a 440 volt three phase alternating current input to provide an output of from about 300 volts direct current to about 600 volts direct current to the direct current load.

Circuit 10 has a current flow controller, such as silicon controlled rectifier 36, an inductor 38, and a capacitor 40 serially connected with each other for de-energizing the then conducting current flow controller in bridge 16, such as any of silicon controlled rectifiers 18, 20, or 22, when an overload is present. The serially connected de-energizing arrangement of silicon controlled rectifier 36, inductor 38, and capacitor 40 is operably connected in parallel in circuit 10 with bridge 16 between bridge 16 and a direct current load as would be located across arrows 12 and 14, respectively. The current flow controller in this de-energizing arrangement, such as silicon controlled rectifier 36, desirably has the general characteristics as previously described herein with regard to the current flow controllers of the invention.

The current flow controller in the de-energizing arrangement, in response to an actuating signal to bring this current flow controller to a conductive state, such as a gating signal to silicon controlled rectifier 36, permits the discharge of capacitor 40 through inductor 38 to provide for the de-energization of the then conducting current flow controller in bridge 16 when the actuating signal to the current flow controllers in bridge 16, such as a gating signal to silicon controlled rectifiers 18, 20, and 22 has been disconnected, as will be discussed further herein. Inductor 38 functions as a current limiting device to substantially prevent the occurrence of a high current spike going through the circuit when capacitor 40 discharges, at the appropriate time, to de-energize the then conducting current flow controller in bridge 16.

The voltage potential at which capacitor 40 is maintained for discharging through the circuit under overload conditions is dependent upon the particular use and application of the circuit. For example, if the direct current load is at a 600 volt direct current voltage potential, the capacitor 40 would be maintained so as to provide a discharge voltage of about 1,000 volts of direct current voltage. As another example, if the direct current load is at a 300 volt direct current voltage potential, the capacitor 40 would be maintained at about a 600 volt direct current voltage potential for discharge through the circuit under overload conditions. Such voltages for the load and capacitor 40 are typical for most underground mining applications where the circuit of the present invention would be employed.

Desirably, de-energizing arrangement of circuit 10 has a capacitor charging device 42 connected in parallel across capacitor 40 for charging capacitor 40 to the desired voltage potential. Preferably, in most mining applications where the circuit of the present invention would be utilized, such as at the 300 volt direct current voltage or the 600 volt direct current voltage potentials for the load as previously discussed, a high voltage capacitor charging device would generally be employed. An example of a high voltage capacitor charging device would include a step-up transformer connected to an alternating current source, a full-wave rectifier to rectify the alternating current output of the step-up transformer to direct current, and would desirably include a current limiting resistor to limit the current charge to the capacitor. Other suitable capacitor charging arrangements could be employed, depending upon the use and application of the present invention.

Circuit 10 has a voltage detection device 44 for detecting a predetermined voltage drop in the circuit of the present invention when an overload condition is present. Voltage detection device 44 is operably connected in circuit 10 in parallel between bridge 16 and the direct current load as would be across arrows 12 and 14, respectively. Ideally, voltage detection device 44 would be a zero voltage detector but is generally a low voltage detector due to the generally non-ideal circuit behavior prevalent in most applications of the circuit of the present invention. Voltage detection device 44 is preferably a solid state circuit having a voltage divider and compares the measured voltage against a reference voltage. If the detected voltage goes below a predetermined level, the voltage detector sends out a signal to an appropriate device indicating that the voltage detected is below the predetermined level. For example, if the direct current load to which circuit 10 is connected is at a 300 volt direct current voltage potential, voltage detection device 44 would generally be set to signal a drop in voltage of below about 50 direct current volts under overload conditions. Voltage detection device 44 above described is an example of a typical voltage detection device suitable with the circuit of the present invention. In the circuit of the present invention, the appropriate device to which voltage detection device 44 sends a signal indicating a predetermined voltage drop is a time delay device 46, to be discussed hereinafter.

Circuit 10 of the present invention has a time delay device 46 which regulates the activation of the de-energizing arrangement of circuit 10, as previously discussed herein, to optimally contol the discharge time of capacitor 40 under overload conditions. Time delay device 46 is operably connected in circuit 10 to voltage detection device 44 and to the current flow controller in the de-energizing arrangement in circuit 10, as previously discussed, which is silicon controlled rectifier 36. Time delay device 46 in circuit 10 is also selectively operably connected to a low voltage direct current voltage source 48, to be discussed hereinafter, low voltage direct current voltage source 48 providing an actuating signal through time delay device 46 to activate to a conductive state the current flow controller in the de-energizing arrangement of circuit 10 under overload conditions, the current flow controller being activated to a conductive state through time delay device 46 is silicon controlled rectifier 36. In circuit 10, time delay device 46 is connected to gate 50 of silicon controlled rectifier 36. Time delay device 46 controls the occurrence of the discharge time of capacitor 40 in response to a signal received from voltage detection device 44 in response to an overload condition indicated by a predetermined voltage drop detected by voltage detection device 44. Time delay device 46 promotes the optimization of the discharge time for capacitor 40 to de-energize under overload conditions the then conducting current flow controller in bridge 16, the current flow controller being silicon controlled rectifier 18, 20, or 22.

An example of a suitable time delay device includes a resistive-capacitive network, a uni-junction transistor, and a pulse transformer. The resistive-capacitive network is located at the input of the uni-junction transistor and the output of the uni-junction transistor is coupled to a pulse transformer which provides an output to gate 50 of silicon controlled rectifier 36. By varying the resistance in the resistive-capacitive network, the duration of the time delay can be controlled.

Circuit 10 has a low voltage direct current voltage source 48 which provides an actuating signal, the actuating signal being operable to activate to a conductive state each current flow controller in bridge 16 and in the de-energizing arrangement of circuit 10. Current flow controllers in circuit 10 being provided with such actuating signal are silicon controlled rectifiers 18, 20, and 22 in bridge 16 and silicon controlled rectifier 36 in the de-energizing arrangement of circuit 10.

Low voltage direct current voltage source 48 in circuit 10 is selectively operably connected to time delay device 46 through contact 52 and selectively operably connected to gates 54, 56, and 58 of silicon controlled rectifiers 18, 20, and 22, respectively, through contact 60. Contacts 52 and 60 are part of a relay device 62, to be discussed hereinafter. Under normal conditions, contact 52 is normally open, and contact 60 is normally closed. With contact 60 closed and contact 52 open the actuating signal or gating signal is supplied only to silicon controlled rectifiers 18, 20, and 22. However, under overload conditions, contact 60 would open and contact 52 would close providing an actuating signal through time delay device 46 to silicon controlled rectifier 36 of the de-energizing arrangement of circuit 10; and the actuating or gating signal to silicon controlled rectifiers 18, 20, and 22 would be disconnected with the opening of contact 60 under overload conditions.

In the circuit of FIG. 10, an example of a low direct current voltage actuating signal to silicon controlled rectifiers 18, 20, and 22 in bridge 16 and to silicon controlled rectifier 36 in the de-energizing arrangement of circuit 10 is about ten direct current volts. Such ten direct current volt actuating signal is suitable, for example, when a 200 volt three phase alternating current input or a 440 volt three phase alternating current input to bridge 16 is used to provide an output of about 300 direct current volts or about 600 direct current volts, respectively, to the direct current load (not shown) as would be connected across arrows 12 and 14, respectively.

An example of a suitable low voltage direct current voltage source is a conventional battery. Another example of a suitable low voltage direct current voltage source includes a step-down transformer, a rectification arrangement, and a filtration arrangement to provide the appropriate direct current voltage actuating signal. In the second example of a low voltage direct current voltage source arrangement, the step-down transformer would receive an alternating current source input, such as a 120 volt alternating current source input, which would then be stepped down to about eight alternating current volts. The six alternating current volt transformer output would be rectified in the rectification arrangement and filtered in the filtration arrangement to provide about a ten direct current volt actuating signal. The above examples of a low voltage direct current voltage source are illustrative of a way of providing an actuating signal in circuit 10. Other suitable arrangements for providing an actuating signal are possible; and the magnitude of the actuating signal can vary in other embodiments of the present invention, depending upon the current flow controllers empoyed and the particular use, application, and the particular embodiment of the present invention.

Circuit 10 has a relay device 62, as hereinbefore mentioned, which operably responds to a direct current overload under faulted conditions. Relay device 62 is operably connected between bridge 16 and the direct current load (not shown) in circuit 10. Preferably, relay device 62 is a series overcurrent relay being serially operably connected between bridge 16 and the direct current load. When an overload condition is sensed by relay device 62, its contact 60 opens and its contact 52 closes to operably disconnect the actuating signal from low voltage direct current voltage source 48 from silicon controlled rectifiers 18, 20, and 22 in bridge 16 and connect the actuating signal from low voltage direct current voltage source 48 to silicon controlled rectifier 36 in the de-energizing arrangement of circuit 10, the connection to silicon controlled rectifier 36 being made through the time delay device 46, as previously discusses herein.

In a preferred embodiment of the invention, relay device 62 additionally and desirably has a contact 64 which operably connects to a direct current circuit interruption device 66, to be discussed hereinafter, to deactivate and open the direct current circuit interruption device 66 in response to a direct current overload. Inclusion of a direct current circuit interruption device is preferred in the present invention, as illustrated in circuit 10.

While a series overcurrent relay, as previously discussed, having contacts 52, 60, and 64 is a suitable relay device for use in the present invention, other suitable relay devices and arrangements are possible in performing the herein described function of relay device 62.

Circuit 10 desirably includes a direct current circuit interruption device 66, as previously mentioned. The direct current circuit interruption device illustrated in circuit 10 is a direct current circuit breaker. In the embodiment of circuit 10, the direct current circuit interruption device desirably has an operating coil 68. In circuit 10, operating coil 68 controls the opening of the direct current circuit interruption device 66 upon occurrence of an overload; and contact 64 of relay device 62 is serially operably connected to operating coil 68 of direct current circuit interruption device 66.

Under overload conditions sensed by relay device 62, contact 64 which is normally in a closed state in circuit 10, would open resulting in the deactivation of direct current circuit interruption device 66 causing it to open due to the de-activation of operating coil 68 through the opening of contact 64. The direct current circuit interruption device 66 is serially connected in circuit 10 between realy device 62 and the direct current load (not shown). The direct current circuit interruption device 66, such as the direct current circuit breaker illustrated in circuit 10, is an example of a suitable direct current circuit interruption device which desirably can be used in the present invention. Other suitable arrangements for and types of a direct current circuit interruption device for use in the circuit of the present invention are possible.

Desirably, the circuit of the present invention has a device for discharging stored energy in the magnetic field of the direct current load upon occurrence of an overload by providing a current path for this stored energy. This device is desirably operably connected in the circuit of the present invention across the direct currend load. An example of a suitable device is illustrated in circuit 10 and is a freewheeling diode 70. Such device as freewheeling diode 70 is desirable if an inductive load is connected to the circuit of the present invention. Freewheeling diode 70 in circuit 10 would desirably provide, under overload conditions, an alternate path for current circulation to discharge the stored energy in the magnetic field of the load and to substantially prevent such stored energy from being discharged through rectifier bridge 16. Freewheeling diode 70 is an example of a suitable means for discharging stored energy in the magnetic field of a direct current load under overload conditions by providing a current path for this stored energy to promote the de-energization of the direct current load.

Figure 2:
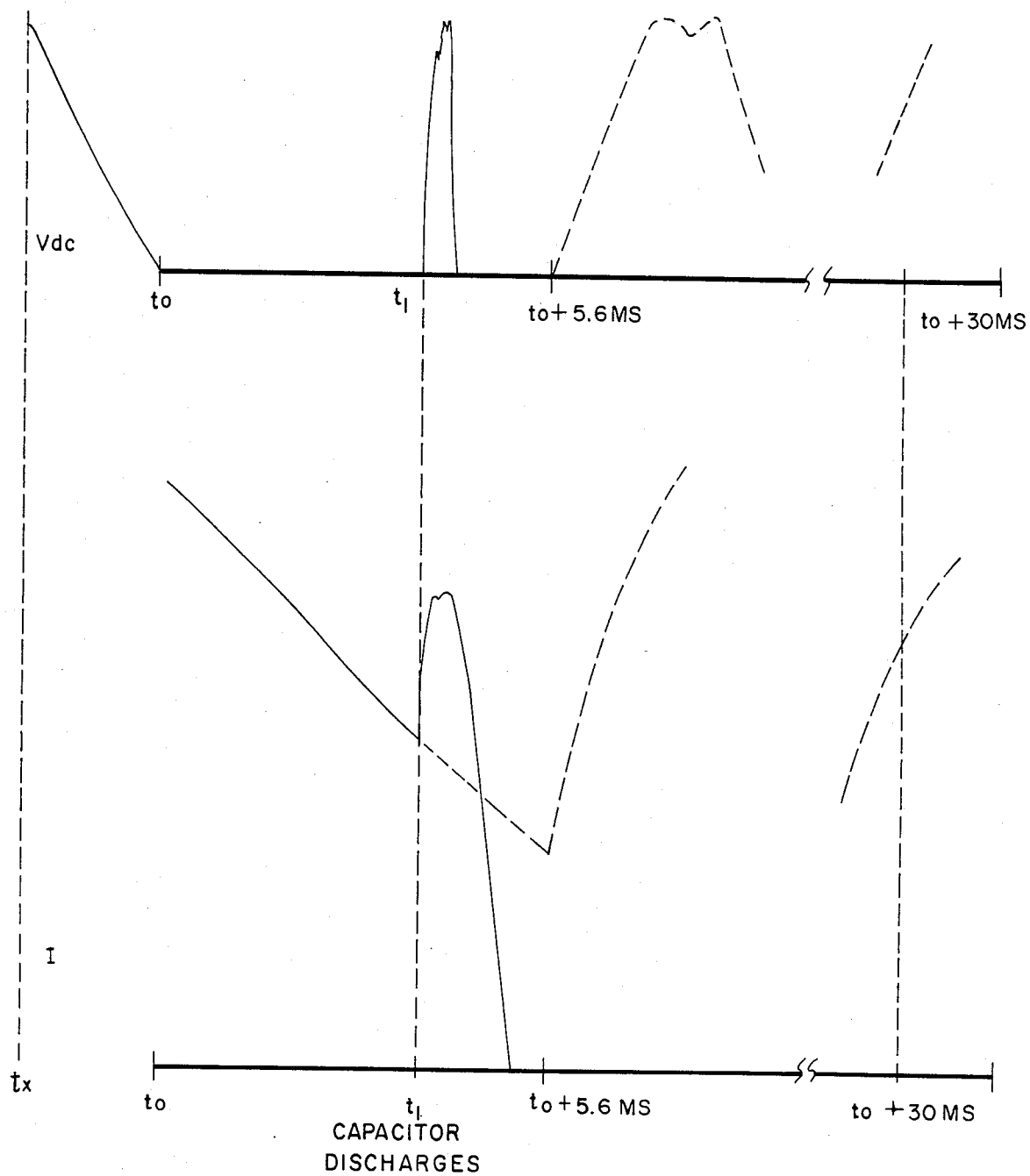
FIG. 2 is a dual plot of direct current voltage versus time and direct current versus time illustrating the arcless de-energization of a direct current load in the circuit of FIG. 1.

Referring to FIGS. 1 and 2, the operation of circuit 10 in the arcless de-energization of a direct current load will now be described. It is to be noted and understood that in FIG. 2 the dual plot of direct current voltage versus time and direct current versus time is illustrative of one particular application of a particular embodiment of the present invention. Further, the various times and time periods indicated in FIG. 2 are again illustrative of a particular embodiment and use of the circuit of the present invention and should not be construed in a limiting sense.

In operation, under normal non-overload conditions, silicon controlled rectifiers 18, 20, and 22 receive a gating or actuating signal through their respective gates 54, 56, and 58 from the low voltage direct current voltage source 48 through closed contact 60 of relay device 62. Under non-overload conditions, contact 52 of relay device 62 is open. The actuating or gating signal from low voltage direct current voltage source 48 places silicon controlled rectifiers 18, 20, and 22 in a conductive state. The three phase alternating current indicated by phases 30, 32, and 34 is rectified in bridge 16 and the direct current output of bridge 16 drives a suitable direct current load as would be located across arrows 12 and 14, respectively, of circuit 10.

Upon occurrence of an overload, relay device 62 would sense the overload and open its contact 60 and its contact 64 and close its contact 52. The opening of contact 60 will disconnect the actuating or gating signal to silicon controlled rectifiers 18, 20, and 22 and would prevent further conduction in the then non-conducting silicon controlled rectifiers in bridge 16. However, the then conducting silicon controlled rectifier in bridge 16 would normally remain in a conductive state. The opening of contact 64 disconnects power to operating coil 68 of direct current circuit interruption device 66, such as the direct current circuit breaker of circuit 10, which would cause, after an appropriate time, direct current circuit interruption device 66 to open. For exemplary purposes, in a typical application such time for the opening of direct current circuit interruption device 66 is shown in FIG. 2 as occuring at time $t_0 + 30$ milliseconds (MS). Further, upon sensing an overload, relay device 62 closes its contact 52 which connects the actuating or gating signal from low voltage direct current voltage source 48 to time delay device 46.

In FIG. 2, the time at which relay device 62 senses an overload is designated as time $t_x$. With the opening of contact 60 disconnecting the low voltage direct current voltage source 48 from silicon controlled rectifiers 18, 20, and 22, the voltage would continue to drop, as shown in FIG. 2, until it ideally reaches zero at time $t_0$, although in practical applications such voltage would drop to a relatively low voltage having a value greater than zero volts. At time $t_0$ when the voltage has reached a predetermined low value, voltage detection device 44 operates sending a signal to time delay device 46. As can be seen from FIG. 2, while at about time $t_0$ the voltage is approaching zero, the current is still at a relatively high value due to the present short circuit overload condition.

Upon receipt of the appropriate signal from voltage detection device 44 at about time $t_0$, time delay device 46 operates; and after the appropriate time delay, indicated from FIG. 2 as being from time $t_0$ to time $t_1$, the time delay device 46 allows the actuating or gating signal from low voltage direct current voltage source 48 to activate to a conductive state silicon controlled rectifier 36 permitting the discharge of capacitor 40 through inductor 38 and through the direct current load. This discharge of capacitor 40 de-energizes the then conducting silicon controlled rectifier in bridge 16 to a non-conductive state and, with the other silicon controlled rectifiers in bridge 16 which have already been placed in a non-conductive state, as previously described, de-energizes bridge 16. The discharge of capacitor 40 reverse biases the then conducting silicon controlled rectifier in bridge 16 to place this silicon controlled rectifier in a non-conductive state.

As can be seen from FIG. 2, from time $t_0$ to time $t_1$ the current I is decreasing in value. At time $t_1$ when capacitor 40 discharges, the current and the voltage increase as indicated by the current and voltage spikes shown in FIG. 2 at around time $t_1$. As noted from FIG. 2, the discharge of capacitor 40 occurs within a relatively short time to bring the voltage and current down to zero by placing the then conducting silicon controlled rectifier in rectifier bridge 16, as previously discussed, in a non-conductive state. In the example illustrated in FIG. 2, the complete de-energization of bridge 16 occurs before time $t_0 + 5.6$ MS which, in this example, is the time just prior to a typical 60 cycle alternating current voltage input to bridge 16 becoming positive.

In the example of FIG. 2, the entire de-energization operation has occurred within one cycle after the overload has been sensed as occurring by relay device 62. As can be seen from FIG. 2, in this particular example, the direct current circuit interruption device 66 has not opened prior to rectifier bridge 16 being de-energized, the opening of direct current circuit interruption device 66 taking place about time $t_0 + 30$ ms. With the de-energization completed before the circuit interruption device 66 opens, the risk of any arcing occurring at device 66 is substantially eliminated, thus providing for the arcless de-energization of the direct current load.

In the example of FIG. 2, if the then conducting silicon controlled rectifier in rectifier bridge 16 was not de-energized, as previously discussed herein, the voltage and current waveforms would substantially follow the respective "dotted" line waveforms appearing in FIG. 2. The "solid" line current and voltage waveforms of FIG. 2 graphically illustrate a typical de-energization of a direct current load according to the invention.

Additionally, freewheeling diode 70 in circuit 10 desirably provides a current path to discharge the stored energy in the magnetic field of the load under overload conditions, especially if the load is an inductive load, and desirably assists in preventing discharge of this stored energy into rectifier bridge 16.

A particular advantage of the circuit of the present invention, as illustrated in circuit 10, is that a single de-energizing arrangement, as previously discussed herein, is employed to de-energize the then conducting silicon controlled rectifier in rectifier bridge 16, regardless of which silicon controlled rectifier in rectifier bridge 16 is conducting at the occurrence of an overload.

Another advantage of the present invention, as illustrated in circuit 10, is that a single low voltage direct current voltage source can be used to provide the actuating or gating signal to the silicon controlled rectifiers in rectifier bridge 16 and in the de-energizing arrangement of circuit 10.

Further, by optimally controlling the activation of the de-energizing arrangement of circuit 10 by use of a time delay device and a voltage detection device, as discussed herein, the component sizing of the components in the de-energizing arrangement of circuit 10 can be desirably optimized.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A circuit for the arcless de-energization of a direct current load receiving direct current from a rectified alternating current source comprising, means for rectifying alternating current from an alternating current source to provide therefrom direct current to said direct current load, said means for rectifying having a current flow controller connected with each phase of said alternating current source and said means for rectifying being operably connected in said circuit with said direct current load, means for de-energizing the then conducting current flow controller in said means for rectifying, said means for de-energizing having a current flow controller and being operably connected in said circuit with said means for rectifying between said means for rectifying and said direct current load, a voltage detection device for detecting a predetermined voltage drop in said circuit, said voltage detection device being operably connected in said circuit between said means for rectifying and said direct current load, a time delay device for regulating the activation of said means for de-energizing, said time delay device being operably connected in said circuit to said voltage detection device and to said current flow controller in said means for de-energizing, means for providing an actuating signal being operable to activate to a conductive state each current flow controller in said means for rectifying and in said means for de-energizing, said means for providing an actuating signal being selectively operably connected in said circuit to said time delay device and to said means for rectifying, and a relay device being operable to respond to a direct current overload, said relay device being operably connected in said circuit between said means for rectifying and said direct current load and being operable to disconnect said actuating signal from said means for rectifying and connect said actuating signal to said means for de-energizing.

2. The circuit as set forth in claim 1 wherein, each said current flow controller in said means for rectifying and in said means for de-energizing is a silicon controlled rectifier.

3. The circuit as set forth in claim 2 wherein, said means for de-energizing has a capacitor, an inductor, and a silicon controlled rectifier serially connected with each other.

4. The circuit as set forth in claim 3 wherein, said means for de-energizing has a capacitor charging device connected across said capacitor in said means for de-energizing, said capacitor charging device being operable to electrically charge said capacitor.

5. The circuit as set forth in claim 4 further comprising, means for discharging stored energy in the magnetic field of said direct current load upon occurrence of an overload, said means for discharging being operably connected in said circuit across said direct current load to provide a current path for said stored energy.

6. The circuit as set forth in claim 5 wherein, said means for discharging is a freewheeling diode.

7. The circuit as set forth in claim 6 further comprising, a direct current circuit interruption device operably connected in said circuit between said relay device and said direct current load.

8. The circuit as set forth in claim 7 wherein, said relay device operably connects in said circuit to said direct current circuit interruption device and is operable to de-activate and open said direct current circuit interruption device in response to a direct current overload.

9. A circuit for the arcless de-energization of a direct current load receiving direct current from a rectified alternating current source comprising, means for rectifying alternating current from an alternating current source to provide therefrom direct current to said direct current load, said means for rectifying having a silicon controlled rectifier connected with each phase of said alternating current source and said means for rectifying being operably connected in said circuit with said direct current load, means for de-energizing the then conducting silicon controlled rectifier in said means for rectifying, said means for de-energizing having a silicon controlled rectifier and being operably connected in said circuit with said means for rectifying between said means for rectifying and said direct current load, a voltage detection device for detecting a pre-determined voltage drop in said circuit, said voltage detection device being operably connected in said circuit between said means for rectifying and said direct current load, a time delay device for regulating the activation of the means for de-energizing, said time delay device being operably connected in said circuit to said voltage detection device and to said silicon controlled rectifier in said means for de-energizing, a low voltage direct current voltage source being operable to provide a gating signal for gating to a conductive state each silicon controlled rectifier in said means for rectifying and in said means for de-energizing, said low voltage direct current voltage source being selectively operably connected in said circuit to said time delay device and to said means for rectifying, and a relay device being operable to respond to a direct current overload, said relay device being operably connected in said circuit between said means for rectifying and said direct current load and being operable to disconnect said gating signal from said means for rectifying and connect said gating signal to said means for de-energizing through said time delay device.

10. The circuit as set forth in claim 9 wherein, said means for de-energizing has a capacitor, an inductor, and a silicon controlled rectifier serially connected with each other.

11. The circuit as set forth in claim 10 wherein,
said means for de-energizing has a high-voltage capacitor charging device connected across said capacitor in said means for de-energizing, said high-voltage capacitor charging device being operable to electrically charge said capacitor.

12. The circuit as set forth in claim 11 further comprising,
a freewheeling diode, said freewheeling diode being operably connected across said direct current load to provide a current path in said circuit to discharge stored energy in the magnetic field of said direct current load upon occurrence of an overload.

13. The circuit as set forth in claim 12 further comprising,
a direct current circuit interruption device, said direct current circuit interruption device being operably connected in said circuit between said relay device and said direct current load.

14. The circuit as set forth in claim 13 wherein,
said relay device operably connects in said circuit to said direct current circuit interruption device and is operable to de-activate and open said direct current circuit interruption device in response to a direct current overload.

15. A circuit for the arcless de-energization of a direct current load receiving direct current from a rectified three phase alternating current source comprising,
a silicon controlled rectifier bridge having a silicon controlled rectifier operably connected to each phase of said three phase alternating current source and being operable to provide therefrom direct current to said direct current load, each silicon controlled rectifier being in parallel relation with any other silicon controlled rectifier in said silicon controlled rectifier bridge and said silicon controlled rectifier bridge being operably connected in said circuit with said direct current load,
a means for de-energizing the then conducting silicon controlled rectifier in said silicon controlled rectifier bridge, said means for de-energizing having a silicon controlled rectifier, an inductor, and a capacitor serially connected with each other and said means for de-energizing being operably connected in said circuit with said silicon controlled rectifier bridge between said silicon controlled rectifier bridge and said direct current load,
a voltage detection device for detecting a predetermined voltage drop in said circuit, said voltage detection device being operably connected in said circuit between said silicon controlled rectifier bridge and said direct current load,
a time delay device for regulating the activation of the means for de-energizing, said time delay device being operably connected in said circuit to said voltage detection device and to said silicon controlled rectifier in said means for de-energizing,
a low voltage direct current voltage source being operable to provide a gating signal for gating to a conductive state each silicon controlled rectifier in said silicon controlled rectifier bridge and said silicon controlled rectifier in said means for de-energizing, said low voltage direct current voltage source being selectively operably connected in said circuit to said silicon controlled rectifier bridge and to said time delay device, and
a relay device being operably to respond to a direct current overload, said relay device being operably connected in said circuit between said silicon controlled rectifier bridge and said direct current load and being operable to disconnect said gating signal from each said silicon controlled rectifier in said silicon controlled rectifier bridge and connect said gating signal to said silicon controlled rectifier in said means for de-energizing.

16. The circuit as set forth in claim 15 wherein,
said means for de-energizing has a high voltage capacitor charging device, said high voltage capacitor charging device being operably connected across said capacitor in said means for de-energizing and being operable to electrically charge said capacitor.

17. The circuit as set forth in claim 16 further comprising,
a freewheeling diode, said freewheeling diode being operably connected across said direct current load to provide a current path in said circuit to discharge stored energy in the magnetic field of said direct current load upon occurrence of an overload.

18. The circuit as set forth in claim 17 further comprising,
a direct current circuit interruption device, said direct current circuit interruption device being operably connected in said circuit between said relay device and said direct current load.

19. The circuit as set forth in claim 18 wherein,
said relay device operably connects in said circuit to said direct current circuit interruption device and is operable to de-activate and open said direct current circuit interruption device in response to a direct current overload.

20. The circuit as set forth in claim 19 wherein,
each silicon controlled rectifier in said silicon controlled rectifier bridge has a diode serially in connection therewith, said silicon controlled rectifier bridge being operable to provide full-wave rectification of said three phase alternating current source.

* * * * *